United States Patent [19]
Armand et al.

[11] Patent Number: 6,085,015
[45] Date of Patent: Jul. 4, 2000

[54] LITHIUM INSERTION ELECTRODE MATERIALS BASED ON ORTHOSILICATE DERIVATIVES

[75] Inventors: Michel Armand, Montréal, Canada; Christophe Michot, Grenoble, France; Nathalie Ravet, Montréal, Canada; Martin Simoneau, Montréal, Canada; Pierre Hovington, Montréal, Canada

[73] Assignees: Hydro-Quebec, Montréal, Canada; Centre National de la Recherche Scientifique, Paris, France

[21] Appl. No.: 09/047,225

[22] Filed: Mar. 25, 1998

[30] Foreign Application Priority Data

Mar. 25, 1997 [CA] Canada .................................. 2200999

[51] Int. Cl.$^7$ ...................................................... H01M 4/48
[52] U.S. Cl. ........................... 385/140; 385/141; 429/218
[58] Field of Search ..................................... 429/221, 224, 429/231.95, 218; 385/140, 147, 141

[56] References Cited

U.S. PATENT DOCUMENTS 3,742,185  6/1973  Parks .................................. 219/146.22

*Primary Examiner*—John D. Lee
*Attorney, Agent, or Firm*—Oblon, Spivak, McClelland, Maier & Neustadt, P.C.

[57] ABSTRACT

An orthosilicate whose structure is based on $SiO_4^{4}$ tetranions which contains at least one transition element with at least two valence states. Lithium ingresses or egresses into or from the structure in order to compensate for a change in valency of the redox couple during electrode operation and thereby maintain overall electroneutrality.

23 Claims, No Drawings

LITHIUM INSERTION ELECTRODE MATERIALS BASED ON ORTHOSILICATE DERIVATIVES

BACKGROUND OF THE INVENTION a) Field of the Invention

The invention relates to new lithium insertion electrode materials based on orthosilicate derivatives, electrochemical generators and variable optical transmission devices having an electrode containing these materials.

b) Description of the Prior Art

Electrode materials are mainly derivatives of transition metals chalcogenides, especially oxides having a lamellar structure like $Li_xCoO_2$ or spinels like $Li_{2-x}Mn_2O_4$. These materials usually operate via a lithium insertion mechanism with less than one lithium and electron exchanged per transition metal in the unit formula ($0 \leq x \leq 0.6$). Besides, these materials suffer from facile loss of the transition metal which is leached into the electrolyte. Cobalt is prohibitively expensive for large scale application.

Materials with the olivine structure $LiFePO_4$ (triphylite) and the quasi-isomorphous delithiated material noted as "$\square FePO_4$" where "$\square$" represents the lithium site vacancies, have the advantage of an operating voltage of 3.5 V vs. $Li^+/Li^\circ$, i.e. in the stability window of both liquid and polymer electrolytes with a flat discharge (lithium intercalation) plateau. The materials are however limited by relatively both slow $Li^+$ diffusion kinetics and low electronic conductivity due to the high electronegativity of the phosphate anion. The absence of non-stoichiometry or mutual miscibility for both phases ($LiFePO_4$ and $\square FePO_4$) is an advantage in terms of the shape of the discharge curve but limits the kinetics of phase transformation which may lead ultimately at high current densities to fragmentation of the material and loss of contact with the carbon grains acting as current collector. The phosphate of this type offer the possibility of exchanging only one lithium per unit formula.

Conversely, it is known that the compounds with either the $Li_2SO_4$, $Li_3PO_4$, $Li_4SiO_4$ and their solid solutions possess relatively high diffusion coefficients for lithium ions, but have no redox activity.

SUMMARY OF THE INVENTION

In the present invention, orthosilicates containing the $SiO_4^{4-}$ tetranion as the building block are used as redox materials by incorporation of at least one transition elements with at least two valency levels. Lithium ingress or egress from the structure to compensate for the valency change of the redox couples during electrode operation and keep overall electroneutrality.

DESCRIPTION OF PREFERRED EMBODIMENTS

The general formula of the materials of the invention is:

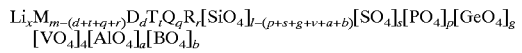

where:

M represents $Mn^{2+}$ or $Fe^{2+}$ and mixtures thereof;

D represents a metal in the +2 oxidation state, chosen among:
$Mg^{2+}$, $Ni^{2+}$, $Co^{2+}$, $Zn^{2+}$, $Cu^{2+}$, $Ti^{2+}$, $V^{2+}$, $Ca^{2+}$;

T represents a metal in the +3 oxidation state chosen among:
$Al^{3+}$, $Ti^{3+}$, $Cr^{3+}$, $Fe^{3+}$, $Mn^{3+}$; $Ga^{3+}$, $Zn^{2+}$, $V^{3+}$ Q represents a metal in the +4 oxidation state, chosen among:
$Ti^{4+}$, $Ge^{4+}$, $Sn^{4+}$, $V^{4+}$ R represents a metal in the +5 oxidation state, chosen among:
$V^{5+}$, $Nb^{5+}$, $Ta^{5+}$.

All M, D, T, Q, R, are element residing in octahedral or tetrahedral sites; s, p, g, v, a, and b are the stoichiometric coefficient for $S^{6+}$ (sulfate), $P^{5+}$ (phosphate), $Ge^{4+}$ (germanate), $V^{5+}$ (vanadate), $Al^{3+}$ (aluminate) and $B^{3+}$ (borate) respectively residing in the silicon tetrahedral sites.

The stoichiometric coefficients d, t, q, r, p, s v, a, b are all positive comprised between zero (inclusive) and 1 (inclusive). Other conditions are:

$0 \leq x \leq 2$ $1 \leq m \leq 2$ $p+s+g+v+a+b<1$ (exclusive)

$x+2m+t+2q+3r=4-p-2s-v+a+b$

Silicon is the second most abundant element in the earth crust, and silicates structures are chemically very robust, and thus electrochemically stable. The preferred transition metals besides iron and manganese are chosen among: titanium, vanadium, chromium, manganese, iron, cobalt, nickel, copper, niobium, and tantalum. The compounds containing a large fraction of iron and/or manganese are preferred due to the abundance and lack of toxicity of these elements. In addition, metals with valency or redox states whose potential lies outside the domain of operation of the electrode can be substituted partially for the transition elements to improve the diffusion characteristics of the lithium ions and/or increase the number of available sites, help control grain size and allow the existence of continuous solid solution between the oxidized and reduced form of the electrode material. These elements are preferably chosen among lithium, magnesium, calcium, zinc aluminum, gallium and tin. For instance, these substitutions allows for the coexistence of iron and/or manganese in two different oxidation states in the same phase, or introduce specific interactions with other elements having redox levels close to those of Fe and Mn (e.g.: $Fe^{2+}/Ti^{4+} \square Fe^{3+}/Ti^{3+}$, $Mn^{2+}/V^{5+} \square Mn^{3+}/V^{4+}$ etc. . . . ) both of which are favorable to electronic conductivity, while disorder on the anionic site provides preferential diffusion sites for $Li^+$.

Another aspect of the invention relates to the possibility to substitute the silicon sites by various elements. The orthosilicate anion being isosteric with the sulfate, phosphate, germanate and vanadate anions, the corresponding elements can easily replace silicon in this types of structure, as does boron and aluminum, offering a wide choice of materials with complete control of the charge density on the anionic sites. Similarly, the propensity of orthosilicates structures to accommodate large fractions of either vacancies or interstitial ions is very favorable to lithium ion diffusion while maintaining the integrity of the structure during lithium intercalation-desintercalation processes.

The materials according to the invention have preferably the orthorombic structures determined by X-ray and electron diffraction for lithium phosphate (a and g forms, both the low and high temperature form, where the metal ions occupy partially either the seven unoccupied tetrahedral sites left or the "stuffed olivine" structure with a partial occupancy of the four octahedral sites (ASTM N° 25-1020 and 15-760) or that of lithium orthosilicate $Li_4SiO_4$. Capacities well in excess of 160 mAh/g can be obtained, which are superior than for the conventional electrode materials. Another advantage of the materials of the present invention is to prevent the leaching of transition metals into the electrolyte due to the high charge of the orthosilicate anion $SiO_4^{4-}$ which bind selectively the multiply charged cations, including the transition elements.

The compounds of the invention are especially useful, when used alone or in admixture with other redox-active compounds, as a component of stable electrode materials in electrochemical cells, and primary or secondary batteries in which the negative electrode is a source of lithium ions. Typical examples include, in a non limiting way, metallic lithium, lithium alloys, nanodispersions of such alloys in a lithium oxide matrix, such as those obtained by reduction lithium intercalation compound in carbon, especially graphite or carbonaceous matters resulting from the pyrolysis of organic derivatives, like petroleum coke or polyparaphenylene, lithium-titanium spinels of general formula $Li_{1+y}Ti_{2x31\ x/4}O_4$ ($0 \leq x \leq 1$, $0 \leq y \leq 1$, independently) and its solid solutions with other spinels, or a lithium-transition metal mixed nitride like, $Li_{3-x}Co_xN$ ($0 \leq x \leq 1$,). These materials can be used alone or in admixtures.

Other applications are in supercapacitors or as counter-electrode for controlled reflection-transmission windows ("smart windows") due to the low optical absorption of the compounds in different oxidation states.

The compounds of the present invention are easily prepared by the techniques of inorganic chemistry and ceramics known to the man skilled in the art. In general, oxides, salts or derivatives of the elements to be incorporated in the final composition of the material are mixed in a predetermined ratio and heated at a preset temperature to ensure reaction. Preferably, the metallic salts are those derived from anions that easily decompose at moderate temperatures to leave the oxides. These include the organic salts like acetates, oxalates and in general carboxylic acid derivatives, betadiketonates, alkoxides or mixtures thereof. Preferred inorganic salts similarly are chosen among hydroxides, nitrates, carbonates, sulfates. The so-called sol-gel techniques are especially appreciated as they allow to incorporate the elements in a highly dispersed form which results in homogeneous powders of controllable grain size at relatively low temperature. The silicon alkoxides are especially useful for this purpose as they hydrolyze into silica precursors at room temperature and the silica gel thus formed have a high surface area and adsorbs large quantities of metal salt leading to homogeneous materials upon heat treatment. A wide choice of silicon, titanium, germanium, aluminum derivatives alkoxides are commercially available. Variations of this technique are the coprecipitation of elements form aqueous or non-aqueous media and the Pechini process where polyester-polyacid is formed in solution and chelates the ion from solution this step being followed by, drying and pyrolysis. The control of the oxidation level of the elements, especially transition elements can be achieved by working in a controlled environment. Low partial pressures of oxygen can be maintained with vacuum, an inert gas or reducing mixtures like hydrogen or carbon monoxide/carbon dioxide mixture. Well defined oxygen activities can thus be obtained from known thermodynamical data. Conversely, air or oxygen bring the transition element to high valence states.

The redox state of the material can also be controlled by chemical extraction or insertion of lithium from the structure, thus mimicking the electrode operation. In a non limiting way, known oxidants able to extract lithium can be chosen among bromine, chlorine, iodine, the nitrosonium or nitronium salts of stable anions like $NO^+BF_4^-$ or $NO_{2+}^+PF_6^-$. Reducing agents, in a non limiting way can be similarly chosen among: the iodide ion, $LiBH_4$, the radical-anion derivatives of lithium with condensed aromatic molecules (naphtalene, anthracene, benzophenone), organometallic reagents like butyl lithium, lithium thiolates. The desired degree of lithium content of the compounds of the invention can also be obtained electrochemically.

EXAMPLES

Example 1

To 90 ml of water and 10 ml of methanol are added 20.4 g of lithium acetate dihydrate $Li(C_2H_3O_2),2(H_2O)$, 24,5 g of manganese acetate tetrahydrate $Mn(C_2H_3O_2)_2,4(H_2O)$ and 14.8 ml of tetramethoxysilane. The mixture is milled with zirconia pellets in a heavy walled plastic container on a roller mill for 60 hours. The thick slurry is poured onto a PTFE evaporating dish and dried at 90° C. in an oven with air circulation. The resulting mass powdered in a mortar and the organic residues are removed by heat treatment at 350° C. in air. The resulting brownish-green powder is transferred to an alumina boat and the compound is treated at 800° C. in a electrically heated furnace under a reducing gas stream containing 8% hydrogen diluted in argon. 13 g of $Li_2MnSiO_4$ are obtained (81% yield).

Example 2

71.8 g of ferrous oxide FeO and 89.9 of lithium metasilicate $Li_2SiO_3$ are ball-milled with high carbon steel ball for 4 hours. The resulting mixture is transferred into a quartz ampoule in which some iron turnings are added. The ampoule is evacuated under secondary vacuum while kept at 200° C. and sealed. The reaction $FeO+Li_2SiO_3>Li_2FeSiO_4$ is complete at 800° C. in 4 hours. After cooling, the ampoule is opened under argon and the iron turnings are removed magnetically.

Example 3

Iron protoxide FeO (71.8 g) and lithium metasilicate $Li_2SiO_3$ (90 g) are ball milled with high carbon steel ball for 4 hours. The resulting mixture is transferred into a quartz ampoule in which some iron turnings are added. The ampoule is evacuated under secondary vacuum while kept at 200° C. and sealed. The reaction: $FeO+Li_2SiO_3>Li_2FeSiO_4$ is complete at 800° C. in 4 hours.

Example 4

21.6 g of iron oxalate dihydrate, 1.79 g manganese oxalate dihydrate and 5.17 g of lithium carbonate are milled similarly as in example 1 with 13,4 g of polydiethoxysiloxane (Gelest Inc, Tullytouwn Pa., U.S.A. catalog N° PSI-023) in 100 ml of 96 % ethyl alcohol. The resulting slurry is evaporated and calcined at 500° C. under air. The cake is pulverized in a ball mill for 20 minutes and the resulting powder is treated at 1050° C. for 10 hours in an tubular furnace under an equivolumic mixture of $CO_2$ and CO. The resulting compound has the formula $Li_{1.4}Fe_{1.2}Mn_{0.1}O_4$.

Example 5

To 50 ml of methanol are added 19.4 g of lithium acetate dihydrate $Li(C_2H_3O_2), 2(H_2O)$, 19.6 g of manganese acetate tetrahydrate $Mn(C_2H_3O_2)_2, 4(H_2O)$, 14.8 ml of tetramethoxysilane and 2.75 ml of titanium tetraisopropoxide diluted in 20 ml of isopropanol. The mixture is milled with zirconia pellets in a heavy walled plastic container on a roller mill for 60 hours. The slurry is poured onto a PTFE evaporating dish and dried at 80° C. in a air circulation oven. The resulting mass is powdered in a mortar and the organic residues are removed by heat treatment at 350° C. in air. The resulting powder is transferred to an alumina boat and the compound is treated as in example 1 at 800° C. under a reducing gas stream containing 8% hydrogen diluted in argon. The compound obtained corresponds to the formula $Li_{1.9}Mn_{0.8}Ti_{0.1}SiO_4$ where Ti is in the +3 state and manganese is divalent.

Example 6

3 g of the compound of example 2, $Li_2FeSiO_4$ are suspended in 20 ml of acetonitrile and treated with 1.7 g of bromine under stirring at room temperature. After two hours, the suspension is filtered and washed with acetonitrile leaving a solid having the composition $Li_1FeSiO_4$. This corresponds to an electrode capacity of 172 mAh/g. Similarly, 7 g of the material of example 4 g are treated with 3 g of bromine in 50 ml of acetonitrile. After filtration, the material $Li_{0.1}Fe_{1.2}Mn_{0.1}O_4$ is obtained. It corresponds to an electrode capacity of 260 mAh/g.

Example 7

5 g of the compound of example $1Li_2MnSiO_4$ are suspended in 40 ml of nitromethane and treated with 12 g nitronium hexafluorophosphate $NO_2PF_6$ under stirring at room. After two hours, the suspension is filtered and washed with nitromethane leaving a brownish-purple solid having the composition $MnSiO_4$. This corresponds to an electrode capacity of 345 mAh/g Example 8

8 g of the compound of example 1, $Li_2MnSiO_4$ and 3.36 g of lithium iron phosphate $LiFePO_4$ are ball milled with steel balls under an inert atmosphere until the grain size does not exceed 4 microns. The mixture is introduced in a closed-end nickel tube which is evacuated and welded. The tube is treated at 750° for 10 hours and allowed to cool to room temperature. The solid solution obtained has the formula $Li_{1.7}Mn_{0.7}Fe_{0.3}Si_{0.7}P_{0.3}O_4$ Example 9

A solid-state battery using a 10 mm lithium anode laminated on a 10 mm nickel foil, a 25 mm polymer electrolyte and a 45 mm positive electrode is constructed with a total active surface of 4 $cm^2$. The electrolyte is a crosslinked condensation polymer prepared according to *J. Electrochem Soc.* 141–7, 1915 (1994) and *Journal of Power Sources,* 54-1, 40 (1995) with lithium trifluoromethane sulfonimide $Li(CF_3SO_2)_2N$ as a solute corresponding to a 16:1 ratio of oxygens from polymer ether groups to $Li^+$. The positive electrode is obtained from a slurry of 53% by volume of PEO, molecular weight 200 000, 40% by volume of the material of example 4 and delithiated according to example 6, and 7% by volume of Ketjen black® in acetonitrile, by coating technique on a 12 mm aluminium foil. 1.2 lithium per formula unit can be cycled between 3.5 and 2.4 volts.

Example 10

A gel type rocking-chair ("lithium ion") battery is constructed using a 40 mm anode made from graphite flakes (4 mm) with an ethylene-propylene-diene binder (5%) by volume, and laminated on a 10 mm copper foil, a 45 mm electrolyte containing an vinylidene fluoride-hexafluoropropylene copolymer (Solvay, Belgium), 30 ww %, fumed silica (5% ww %) with gelled with a liquid elecrolytes consisting of 1.2 molar lithium hexafluorophate in equivolumic ethylene carbonate-ethylmethyl carbonate (65 ww %) mixed solvent. The positive electrode consists in a blend of the electrode material of example 5 (80 ww %), Ketjen black (8 ww %) and the vinylidene fluoride-hexafluoropropylene copolymer used in the electrolyte (12 ww %). The battery is housed in a flat metal-plastic laminate container allowing for the passage of current leads. At 25° C., the battery operation allows the exchange of 1.3 lithium per manganese in the positive electrode in the voltage range 2–4.3 volts.

We claim:

1. A lithium insertion-type electrode materials having an orthosilicate structure and having the formula:

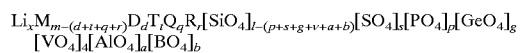

wherein

M represents $Mn^{2+}$ or $Fe^{2+}$ and mixtures thereof;

D represents a metal in the +2 oxidation state selected from the group consisting of:
$Mg^{2+}$, $Ni^{2+}$, $Co^{2+}$, $Zn^{2+}$, $Cu^{2+}$, $Ti^{2+}$, $V^{2+}$ and $Ca^{2+}$;

T represents a metal in the +3 oxidation state selected from the group consisting of
$Al^{3+}$, $Ti^{3+}$, $Cr^{3+}$, $Fe^{3+}$, $Mn^{3+}$, $Ga^{3+}$, $Zn^{2+}$ and $V^{3+}$;

Q represents a metal in the +4 oxidation state selected from the group consisting of
$Ge^{4+}$, $Sn^{4+}$ $Ti^{4+}$ and $V^{4+}$;

R represents a metal in the +5 oxidation state selected from the group consisting of
$V^{5+}$, $Nb^{5+}$ and $Ta^{5+}$;

M, D, T, Q, R, are elements residing in octahedral or tetrahedral sites; s, p, g, v, a, and b are the stoichiometric coefficient for $S^{6+}$ (sulfate), $P^{5+}$ (phosphate), $Ge^{4+}$ (germanate), $V^{5+}$(vanadate), $Al^{3+}$ (aluminate) and $B^{3+}$ (borate) respectively residing in the silicon tetrahedral sites;

the stoichiometric coefficients d, t, q, r, p, s, g, v, a, b are all positive and range from zero (inclusive) and 1 (inclusive);

$0 \leq x \leq 2$, $1 \leq m \leq 2$, p+s+g+v+a+b<1 (exclusive) and x+2m+t+2q+3r=4-p-2s-v+a+b.

2. The electrode material according to claim 1, which has a crystal structure related to that of lithium phosphate or lithium orthosilicate.

3. The electrode material according to claim 1, wherein more than one lithium ion can be extracted or inserted per unit formula.

4. An electrical generator having at least one positive and at least one negative electrode, said at least one positive electrode containing the material according to claim 1 and said at least one negative electrode being a source of lithium ion at a high chemical activity.

5. The electrical generator according to claim 4, wherein the negative electrode is metallic lithium, a lithium alloy, a nanodispersion of a lithium alloy in lithium oxide, a lithium intercalation compound, carbon, carbonaceous matter resulting from the pyrolysis of an organic derivative, a lithium-titanium spinel $Li_{l+y}Ti_{2-x/4}O_4 (0 \leq x \leq 1, 0 \leq y \leq 1)$ or solid solutions of $Li_{1+y}Ti_{2-x/4}O_4 (0 \leq x \leq 1, 0 \leq y \leq 1)$ with other spinels, a lithium-transition metal mixed nitride or mixtures thereof.

6. The electrical generator according to claim 1, wherein a conductive additive is present in the positive electrode.

7. The electrical generator according to claim 6, wherein the conductive additive in the positive electrode material is carbon.

8. The electrical generator according to claim 4, wherein the positive electrode comprises a material of formula $Li_lFe_fMn_mSi_sP_pO_4$ wherein: $f+m \leq 1.2$, $s+p=1$; $0 \leq p \leq 0.6$; $8-5p-4s-2m-2f \geq 1 \geq 8-5p-4s-4m-3f$.

9. The electrical generator according to claim 4, wherein the positive electrode contains another intercalation material in addition to said lithium material insertion-type electrode.

10. The electrical generator according to claim 9, wherein the intercalation material is a lamellar dichalcognenide, a vanadium oxide $VO_x (2.1 \leq x \leq 2.5)$ or a Nasicon-related material like $Li_3Fe_2(PO_4)_3$.

11. The electrical generator according to claim 4, wherein the positive electrode contains a polymeric binder.

12. The electrical generator according to claim 11, wherein the polymeric binder is a homopolymer or copolymer of tetrafluoroethylene or an ethylene-propylene-diene terpolymer.

13. The electrical generator according to claim 12, wherein the positive electrode contains an aprotic solvent and a salt, the cation of which is at least in part $Li^+$.

14. The electrical generator according to claim 13, wherein the polymeric binder is a polyether, cross-linked or not, and contains a dissolved salt, a cation of which is at least in part $Li^+$.

15. The electrical generator according to claim 13, wherein the aprotic solvent is ethylene carbonate, propylene carbonate, dimethylcarbonate, diethylcarbonate, methylethylcarbonate, g-butyrolactone, a tetraalkylsulfamide, a dialkyether of a mon-, di-, tri-, tetra- or higher oligo- ethylene glycol of molecular weight lower or equal to 2000 or mixtures thereof.

16. The electrical generator according to claim 11, wherein the polymeric binder possesses ionic conductivity.

17. The electrical generator according to claim 11, wherein the polymeric binder is swollen by an aprotic solvent and contains a salt, the cation of which is at least in part $Li^+$.

18. The electrical generator according to claim 17, wherein the polymeric binder is a polyether, a polyester, a methylmethacrylate-based polymer, an acrylonitrile-based polymer or a vinylidene fluoride-based polymer.

19. The electrical generator according to claim 17, wherein the aprotic solvent is ethylene carbonate, propylene carbonate, dimethylcarbonate, diethylcarbonate, methylethylcarbonate, g-butyrolactone, a tetraalkylsulfamide, a dialkyether of a mon-, di-, tri-, tetra- or higher oligo-ethylene glycol of molecular weight lower or equal to 2000 or mixtures thereof.

20. An electrical generator of the supercapacitor type which comprises at least one of the electrode materials according to claim 1.

21. A variable optical transmission device constructed from transparent semiconductor coated glass or plastic and two electrodes separated by a solid or gel electrolyte, wherein at least one of the electrodes contains the electrode material according to claim 1.

22. The variable optical transmission device according to claim 21, wherein the at least one electrode is prepared by laying a thin film of said electrode material on a transparent semiconductor coated glass or plastic by a vacuum deposition, sputtering, or from a sol-gel precursor.

23. The electrode material according to claim 1, wherein the crystal structure of the lithium orthosilicate electrode material is the orthorhombic structure of lithium phosphate or lithium orthosilicate.

* * * * *